United States Patent [19]
Breitling et al.

[11] 3,924,538
[45] Dec. 9, 1975

[54] ELECTROMAGNETIC-SUSPENSION VEHICLE SYSTEM

[75] Inventors: Ulrich Breitling, Munich; Klaus Simon, Eichenau, both of Germany

[73] Assignee: Krauss-Maffei Aktiengesellschaft, Munich, Germany

[22] Filed: Mar. 4, 1974

[21] Appl. No.: 447,560

[30] Foreign Application Priority Data
Apr. 17, 1973 Germany............................ 2319387

[52] U.S. Cl........................................... 104/148 MS
[51] Int. Cl.²......................................... B61B 13/08
[58] Field of Search. 104/148 MS, 148 LM, 148 SS, 104/130, 134, 96, 23 FS

[56] References Cited
UNITED STATES PATENTS
3,842,747  10/1974  Schwarzler.................. 104/148 MS
3,845,720  11/1974  Bohn............................ 104/148 MS
3,847,086  11/1974  Steenbeck.................... 104/148 MS FOREIGN PATENTS OR APPLICATIONS
707,032  5/1941  Germany...................... 104/148 MS Primary Examiner—M. Henson Wood, Jr.
Assistant Examiner—Reinhard J. Eisenzopf
Attorney, Agent, or Firm—Karl F. Ross; Herbert Dubno

[57] ABSTRACT

An electromagnetic-suspension vehicle system comprising a track having a pair of armature rails on opposite sides of a vertical median plane through the path of the vehicle for cooperation with rows of electromagnets carried on opposite sides of the vehicle. At turns, crossings and the like, the track is provided with auxiliary rails longitudinally overlapping the main load carrying rail and effective in cooperation with auxiliary magnets carried by the vehicle to bridge gaps in the main rails.

3 Claims, 4 Drawing Figures

ELECTROMAGNETIC-SUSPENSION VEHICLE SYSTEM

CROSS REFERENCE TO RELATED APPLICATIONS

The present application is related to and extends principles originally set forth in the commonly assigned copending application Ser. No. 362,012 filed 21 May 1973 and entitled MAGNETIC SUSPENSION AND GUIDE SYSTEM FOR SUSPENDED VEHICLES ADAPTED TO SWITCH TRACKS (now U.S. Pat. No. 3,851,594).

That application is, in turn, a continuation-in-part of the commonly assigned copending application Ser. No. 324,135 filed 16 January 1973 and entitled ELECTROMAGNETIC SUSPENSION AND GUIDE SYSTEM FOR VEHICLES ADAPTED TO SWITCH TRACKS (now U.S. Pat. No. 3,842,747).

The parent application is also related to the commonly assigned applications:

Ser. No. 268,133 filed 30 June 1972 and entitled ELECTROMAGNETIC SUSPENSION AND DRIVE MEANS (now U.S. Pat. No. 3,797,403);

Ser. No. 280,073 filed 11 Aug. 1972 and entitled ELECTROMAGNETIC SUSPENSION AND/OR GUIDE SYSTEM, ESPECIALLY FOR MAGNETIC SUSPENDED VEHICLES (now U.S. Pat. No. 3,780,668); and Ser. No. 292,638 filed 27 Sept. 1972 and entitled CONTACT SYSTEM FOR HIGH SPEED ELECTRICALLY OPERATED VEHICLES (now U.S. Pat. No. 3,804,997).

FIELD OF THE INVENTION

Our present invention relates to track systems for electromagnetically suspended or magnetic-levitation vehicles having the capability of switching tracks on passing from a main track to a branch track or spur or adapted to cross tracks.

BACKGROUND OF THE INVENTION

Earlier mass transport systems have generally been confined to a rolling vehicle or welded structure displaceable by electrical or other means along a track or right of way engaged by the vehicle wheels. This system had the advantage that it was capable of carrying substantially unlimited loads since all of the forces were applied substantially directly via the wheel structures to the supporting surface or rails of the tracks or roadbed.

With greater need for high speed mass transit, however, such systems have given way to low-friction systems which are not as limited with respect to the speed of the vehicle. For example, electromagnetic suspension vehicles or magnetic levitation vehicles have been proposed in which the track is provided with a pair of longitudinally extending magnetic or magnet-type rail while the vehicle is provided with complementary magnetic means so that a magnetic field can close between the vehicle and the track, the forces being transmitted to the latter by a magnetic field.

As described in the aforementioned copending application, therefore, the track may comprise a pair of armature rails each of which is juxtaposed with a row of electromagnets on the vehicle and a suspension gap is provided between the electromagnet and the armature rails.

In the basic application Ser. No. 362,012 (U.S. Pat. No. 3,851,594), for example, there is described an electromagnetic suspension and guide system for suspended vehicles adapted to switch tracks. The switching of tracks is necessary when the vehicle is to be diverted from one main line onto a spur or siding or is to pass between the main lines of a track network or for any reason where diversion from or to a main track is required.

In that arrangement, the problem of interruption of the main armature rails at the crossings was solved by providing two sets of rails at the crossings in mutually overlapping relationship in the longitudinal direction. More particularly, the vehicle and track systems comprise a vehicle having two rows of electromagnets, each electromagnet consisting of a U-section core and a coil wound thereon, each armature rail having a U configuration so that the shanks of the U define holes which cooperate with the holes of the electromagnets.

In application Ser. No. 324,135 (U.S. Pat. No. 3,842,747) there is described a vehicle and track system with electromagnetic suspension and/or guide means which comprises two rows of electromagnets on the vehicle, each electromagnet consisting of a core and an electromagnetic coil wound upon this core whereby at least the cores are of such configuration that substantially symmetrical and equivalent electromagnetic paths are adapted to be closed therewith by armature rails approaching the electromagnets selectively from each side. Each row is composed of a number of electromagnets disposed one behind another in the direction of displacement of the vehicle and is designed to cooperate with one of the two rails provided for supporting or guiding the vehicle. The two rows of electromagnets perferably are disposed symmetrically to one another with mirror symmetry with respect to a vertical median plane through the vehicle in the direction of travel thereof. The electromagnets thus all lie in a common horizontal plane with each row of electromagnets being symmetric about a respective vertical median plane of symmetry extending in the direction of vertical travel and through the respective row. Each of these last mentioned planes is thus a symmetry plane parallel to the vertical median plane through the vehicle and is the symmetry plane for the cores of the respective electromagnets.

The cores preferably opened (in the last mentioned application) in opposite horizontal directions to accommodate armature rails from either side, at least part of each armature rail being adapted to reach laterally into magnetic cooperation with the core of the associated electromagnets. With this arrangement, each of the electromagnets cooperate with an armature rail juxtaposed therewith from the right side or from the left side such that the rail can be brought exclusively laterally into the magnetic path and withdrawn therefrom exclusively in the lateral direction.

The electromagnets were so disposed that they were mounted on supports or pedestals of the vehicle extending vertically therefrom beyond the horizontal planes defining the upper and lower portions of the vehicle body, the pedestals being spaced apart to accommodate a central track member between them or being adapted to be flanked by a pair of track members depending upon track configuration. In other words, the track along which the vehicle travels may either have a central support member flanked by two rows of electromagnets and provided with outwardly facing armature rails adapted to project into the inner electromagnet paths of the two rows, or a channel configuration with a pair of armature rails flanking the outer poles of the electromagnets and adapted to enter laterally inwardly into the magnetic paths thereof.

Switchovers from one track system to another was readily accommodated by providing, at least in the transition region, that the vehicle should pass from a channel portion of the track to a central portion or vice versa.

The latter arrangement also enabled a symmetric configuration of the track such that one armature rail (mounted upon a respective track portion) could cooperate with one electromagnet row from the exterior while the other armature rail cooperated with the other electromagnet row from the interior. In this case, both armature rail arrangements were disposed at the same side, i.e. either to the right or to the left, of the two rows of electromagnets to facilitate the branching of the vehicle to the respective side.

Each row of electromagnets could include a single row of cores in mirror symmetrical relationship in respect to the vertical plane and in mirror symmetrical relationship with cores of other rows relative to the vertical median plane through the vehicle body. The armature rails then include a respective armature rail which can engage the electromagnets from either side, each row of electromagnets being associated with at least one armature rail so that two armature rails always cooperate to support and guide the vehicle. The electromagnetic cores preferably had double-T configurations with a vertical shank or web so that the magnetic circuit generated by a coil upon the shank or web could be closed over the flanges of the double-T to the left or to the right respectively upon juxtaposition with the respective armature rail.

The armature rail was of U-shape profile or cross section and was attached by its base to a vertical flank of a support beam, the beam being part of a channel or central support structure as previously described. In channel shaped support structure, a pair of beams extended in the direction of vehicle travel and are horizontally spaced parallel to one another with vertical flanges each carrying one armature rail so that the flanges or arms of these rails project symmetrically toward one another and toward a vertical median plane of the vehicle traveling along between the beams.

In the central support configuration, the beams are at least in part straddled by the vehicle and lie in a vertical median plane thereof so that opposite faces or beam carried the armature rails and the flanges of the latter extended outwardly. The flanges, or at least one flange of each of these armature rails, was provided with an edge portion which was preferably turned downwardly to lie in a vertical plane and was adapted to confront a pole piece of the core of an electromagnet carried by the vehicle. Each armature rail defined, with the horizontally projecting flanges or pole pieces of the cores of a corresponding row of electromagnets, a pair of air gaps located one above the other in a common vertical plane. With such armature rails, especially when the system did not make use of separate guide magnets to center the vertical laterally, the flanges of the electromagnet cores were formed with upwardly turned pole pieces at their free ends for juxtaposition with downwardly turned pole pieces of the armature rail. In some cases it was found to be desirable to reduce the magnetic resistance of magnetic circuit including the air gaps by forming one of the flanges of the armature rail and the juxtaposed flange of the core with flat surfaces free from inwardly turned pole pieces and in laterally overlapping relationship.

The force components tending to maintain the vehicle in normal position during vehicle travel were increased, even to the extent that separate guide electromagnets could be avoided, by constructing the row of centrally suspended electromagnets cooperating with each armature row, with two sets of pole pieces respectively flanking each pole piece of the armature rail.

The pole pieces preferably were alternated to opposite sides of the pole pieces of the armature rail, by the horizontal staggering of alternate electromagnetic cores which were of identical configuration, by horizontally staggering the webs of electromagnets having symmetrically flanged cores from side to side, by aligning the axis of the webs of each electromagnet in which alternate electromagnets have longer and shorter horizontal flanges, etc.

When a guide system separate from or in addition to the suspension system was required to counteract horizontal force components, e.g. as produced by wind or centrifugal force, the coils were of a lesser height than the suspension electromagnets but were also wound upon double-T horizontal flanges which received between them a pole piece of a flange of the armature rail so that the remainder of the armature rail was free from magnetic fields produced by the guide electromagnets. This arrangement was particularly suitable for central positioning of the armature rail.

In the latter application, moreover, means was provided at least at the branches or junctions of the track to annul or partially annul the field in selected rails so that, for example, when the vehicle encounters a junction at which addition rails come in to place, the flux produced by the vehicle-borne electromagnets is reduced and a magnetic shock is not applied to the vehicle. In the absence of such means, which maintain the net force on the vehicle substantially constant as it traverses the junction, the vehicle would encounter increased force fields and would be subjected to sudden reduction in applied magnetic force as rails terminate, thereby applying repeated shocks to the vehicle.

The last mentioned means include coils wound upon one of the shanks of each armature rail and were controlled by air-gap sensors or other inductive sensing means juxtaposed with the armature rails and adapted to respond to the juxtaposition of the vehicle electromagnets therewith. Manual means could, of course, also be provided either under the control of a vehicle operator or an operator at the switch junction. The same field annulling means may be used to induce the vehicle to travel along the selected track.

In the system described in application Ser. No. 362,012 of 21 May 1973 U.S. Pat. No. 3,851,594, the above described earlier arrangement was improved by forming each of the rows of electromagnets on the vehicle from two subrows of laterally paired and substantially adjacent electromagnetic members each of which is designed to cooperate with a respective armature rail reaching into the magnetic field of the respective subrow. At least one subrow of each longitudinal electromagnet arrangement or main row is in a state of magnetic interaction with an armature rail at all times during travel over the track network, i.e. as the vehicle negotiates ordinary lengths of track, junction, crossovers and branching locations. More particularly, a pair of electromagnet arrangements were provided in laterally adjacent relationship and included one electromagnet of each subrow, the pair having a common energizing coil. While the use of two subrows of electromagnet members or cores might have increased the total weight of the electromagnetic arrangement extending into main rows along the vehicle, this was not found to constitute a technological disadvantage since even the electromagnets of the double-T must have four available pole pieces or have flanges and the subdivision of electromagnets, so that two distinct cores are provided, generally decreases the fabrication and mounting cost and enables the electromagnet members to have simplified configurations. Since a pair of magnetic members or cores is energized by a common electromagnet coil, the weight and cost of the coils were reduced and the ability of the suspending magnets to serve to center the vehicle laterally was improved.

The successive electromagnet members or cores of each subrow were laterally staggered and had U profiles while the armature rails adapted to be juxtaposed with each subrow was a U profile rail whose flanges or pole pieces reached downwardly to lie normally in vertical planes to opposite sides of a median plane. The electromagnet coils preferably linked pairs of cores to the same side of the armature rails so that all of the coils associated with the cores to one side could be connected to one control circuit while all of the coils of the cores offset to the other side were connected to a second control circuit. The control circuits were individually controllable to adjust the lateral force components and maintained a centered position of the vehicle.

The U configuration of the armature rail and the electromagnetic force combined to permit the armature rail and the cores to approach one another and separate from one another at jucntions or the like in the vertical direction and in a gradual manner, thereby progressively increasing or decreasing the magnetic resistance between each rail and the associated subrows of cores. At least at the junctions at which a transfer of electromagnetic effectiveness from one armature rail and subrow to another armature rail and subrow of the electromagnetic arrangement is to be carried out, the two rails overlapped in the direction of vehicle travel and are inclined relative to the path of vehicle and the normal plane of electromagnet arrangement such that one rail progressively approaches the path of the electromagnet while the other rail progressively recedes from this path so that the net magnetic flux of the electromagnet arrangement remains constant. This progressive rise or progressive recession was accomplished according to this system by tapering the armature rails and/or by mounting the armature rails (which may be of constant cross section) upon inclined supports. Of course, the magnetic force through part of the armature rail may be annulled by use of electrically excitable coils as described earlier.

The vehicle may be driven by a linear induction motor as described in the copending application Ser. No. 324,150 filed 16 Jan. 1973 and entitled TWO-SIDED LINEAR INDUCTION MOTOR ESPECIALLY FOR SUSPENDED VEHICLES (now U.S. Pat. No. 3,820,472).

The overlapping-rail arrangement was structured to avoid any intense increase or diminution in the overall magnetic resistance encountered by each longitudinally extending electromagnet arrangement and hence is without the doubling of the magnetic force which would otherwise be expected because of the action of two rails and two subrows of electromagnets each one side of the vehicle. Hence the application of magnetic shock to the vehicle is prevented.

The crossovers, branches and switch junctions, the rail configuration is provided in such manner that at least in the direction to which the vehicle is to be branched, two armature rails asymmetrically support the vehicle, i.e. are effective to the same side of the respective electromagnet arrangement until the junction is passed, whereupon a symmetrical disposition of the rails is provided. In this manner the switch junction does not require any moving parts.

OBJECTS OF THE INVENTION

It is the principal object of the present invention to provide a vehicle and track system of the general type described which will further extend the principles of the commonly assigned copending application Ser. No. 362,012 and the applications listed therein.

It is another object of the invention to provide an improved electromagnetic suspension vehicle system (magnetic-levitation vehicle system) with particular facility for switching tracks or branching the vehicle from a main line to a spur track and vice versa.

SUMMARY OF THE INVENTION

As mentioned previously, the commonly assigned copending application Ser. No. 362,012 describes an electromagnetic arrangement for a levitation-type vehicle which comprises a pair of transversely spaced longitudinally extending magnet arrangements each formed from a respective row of electromagnets and lying within the outlines of the vehicle body while depending from the bottom thereof, each of these rows magnetically cooperating with an armature arrangement which comprises a pair of armature rails selectively cooperating with one or the other subrow of magnets of each main row. The electromagnets have substantially U-section cores which cooperate with the armature rails.

An important advantage of this system resides in the fact that the vehicle may pass from a single-beam track to a double-beam track or vice versa. A single-beam track is a central-support structure in which the two innermost subrows of electromagnets cooperate with a pair of rails on a central beam and straddle the latter. A double-beam arrangement is a track structure of the channel type in which the two beams of the track flank the vehicle and the outermost subrows of the electromagnets cooperate with the armature rails. Because of the ability of the armature rails to cooperate either with the central support or single beam structure and the outer support or double beam structure the vehicle may pass through crossovers and on to branch tracks and spurs without difficulty and without requiring movable track members. For example, when one of the outer beams must be interrupted to permit a branching of the vehicle to that side, a central beam support is provided in this region whereby asymmetric support of the vehicle may be obtained temporarily to permit the branching.

Within the crossovers and branch junctions, the magnetic supporting and guiding functions shifts from an outer subrow of electromagnetis to an inner subrow and vica versa several times depending upon the complexity of the switching or crossing function.

Where a main row of electromagnets, generally consisting of two subrows, encounters two armature rails simultaneously at such junctions, the magnetic shock or increased magnetic force is of considerable disadvantage and inconvenience unless one of the expedients mentioned above, generally flux nullification, is employed. This of course is relatively expensive since it requires flux nullification coils on the various armature rails.

The problem is avoided according to the present invention, by providing one of the subrows of the electromagnets of each arrangement as a row of main electromagnets and the one subrow as a row of auxiliary electromagnets and providing the armature rail cooperating with the main and auxiliary electromagnets as main armature rails and auxiliary armature rails respectively. The armature rails and cores of the main system can have a pole spacing different from the pole spacing of the armature rails and cores of the auxiliary system so that an encounter between a main armature rail and an auxiliary electromagnet or an auxiliary armature rail and a main electromagnet will not have effective flux-path closure and hence will be without magnetic effect upon the system.

Preferably the pole spacing of the main system is greater than the pole spacing of the auxiliary system.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
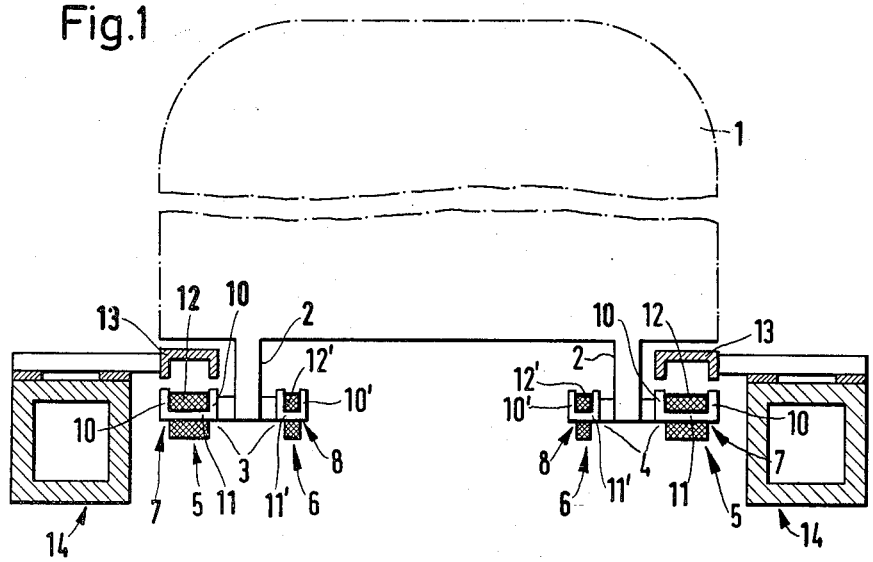
FIG. 1 is a vertical cross section through a vehicle system of the magnetic suspension type according to the present invention.

FIG. 1 shows a magnetic-suspension or magnetic-levitation vehicle 1 in dot-dash outline, this vehicle having the configuration of any of the vehicles of the prior applications mentioned above. On the other side of this vehicle, upon a pair of depending supports 2, there are provided two magnetic arrangements 3, 4, each extending longitudinally along one side of the vehicle and cooperating with armature rails on the respective side of the support track. Each of these magnets have arrangements or main rows of electromagnets comprising two parallel subrows of electromagnets 5 and 6, the electromagnet 6 lying inwardly of the supports 2 and the electromagnet 5 lying outwardly thereof.

Subrow 5 comprises electromagnets 7 each of which has a U-cross section core 10, 11, consisting of a pair of upstanding pole shanks 10 bridged by a web 11 upon which a coil 12 is wound.

The electromagnets 8 likewise comprise cores 10', 11' and coils 12'. The pole shanks 10' are bridged by webs 11' and carry the coil 12'.

The two outer rows 5 of electromagnets constitute a main system and the two inner rows 6 of electromagnets constitute an auxiliary system for supporting the vehicle as it travels along a track and negotiates branch regions or junctions as generally described.

The electromagnets 7 are designed for long-duration support of the vehicle and having relatively large spaced of the pole shanks or pole pieces 10 of their cores. They have a large core cross section and coil cross section to provide the major portion, at least, of the suspension force which is required.

The auxiliary electromagnets 8 have a smaller pole spacing and smaller magnetic and coil cross section.

Figure 2:
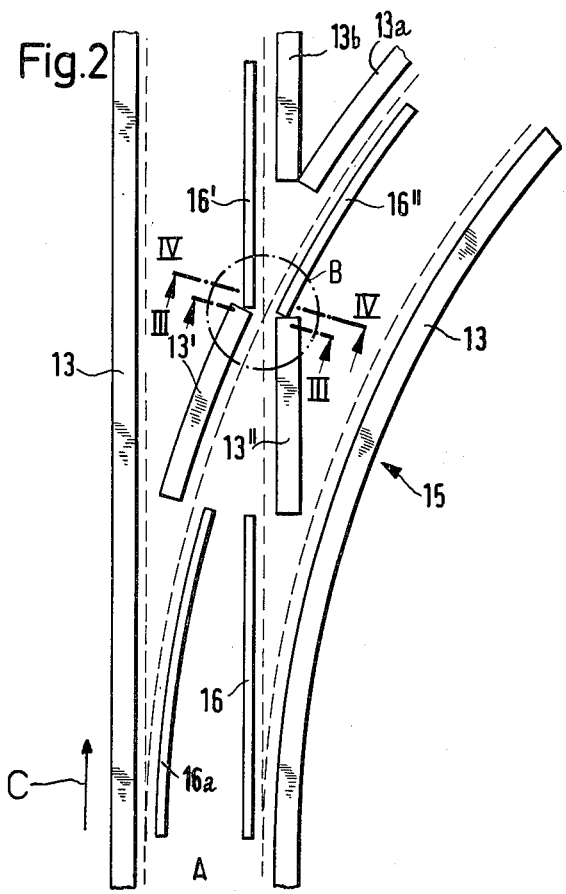
FIG. 2 is a plan view of a branch track arrangement therefor, partly shown in diagrammatic form.
Figure 3:
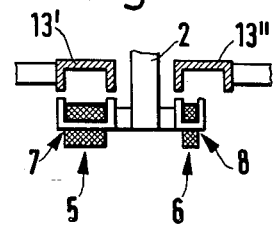
FIG. 3 is a cross section along the line III-III of FIG. 2.
Figure 4:
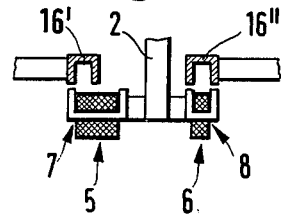
FIG. 4 is a section along the line IV-IV of FIG. 2

The track for the system is best seen in FIG. 2 and comprises along its straight portion, a pair of horizontal beams 14 which flank the path of vehicle travel and are supported at intervals by pylons or the like. Upon the beams there are mounted downwardly open U-section armature rails 13 whose pole spacing is identical to that of the cores 10, 11 of the main electromagnets 7. As can be seen from the FIG. 1, therefore, for normal travel along the track, whether straight or curved, the two outer rows 5 of electromagnets cooperate with large magnetic cross section armature rails 13 to support the vehicle over the usual suspension gap. During this phase of the vehicle operation, the electromagnets 8 are unused. The auxiliary system of electromagnets 8 is employed exclusively at branch locations or crossovers in which the beam 14 or its rail 13 may be interrupted. A typical branch location is shown in FIG. 2 in which the track has a spur 15 to the right.

The left hand armature rail 13, in this case, continues linearly along the straight portion of the track. The right hand armature rail 13 curves to the right and, beyond the junction, cooperates with a new armature rail 13a to continue the spur. Beyond the junction also, another main armature rail 13b runs parallel with the linear left hand armature rail 13. Thus, within the junction, there is a gap parallel to the left hand rail 13 over which the right hand side of a vehicle traveling along the straight track and the left hand side of a vehicle traveling along the curved branch must be supported. To this end, armature rail portions 13' and 13'' are provided respectively parallel to the curved rail and the linear rail. However, there remain gaps within the main armature rail system 13, 13a, 13b, 13' and 13''.

These gaps are filled, according to the invention, by auxiliary armature rails 16, 16', 16'' of small pole spacing, i.e. of a pole spacing corresponding to that of the core of the electromagnets 8 of the auxiliary system. One such auxiliary rail 16 extends parallel to the left hand main armature rail 13 as the curved armature rail deviates to the right, thereby providing support for the right hand side of a vehicle traveling in the direction of arrow C as it enters the junction. If the vehicle is to branch to the right, of course, its right hand side is supported by the armature rail 13 curving in this direction so that another auxiliary rail 16a is employed to support the left hand side of the branching vehicle over the region of the curve. At the center of the junction, the main armature rail portions 13' and 13'' assume a supporting function temporarily and beyond them the auxiliary armature rails 16' and 16'' are provided respectively parallel to the linear and curved main rails.

Thus, wherever the vehicle is not supported by two main rails, it is supported by one main rail and one auxiliary rail.

As the vehicle traverses the junction, it undergoes four rail changes. Thus a vehicle traveling straight in the direction of arrow C through the junction is first supported on two main rails 13, is next supported on the left hand main rail 13 and on auxiliary rail 16, is then supported on the left hand main rail 13 and the transition main rail 13'', is then supported on the left hand main rail 13 and on the auxiliary rail 16' and is finally supported on the left hand main rail 13 and the main rail 13b. Similar transitions apply for the branching vehicle and vehicles traveling in opposite directions.

As can be seen from FIG. 2 in the region circled at B, there is an unavoidable encounter by the vehicle of locations at which more than two armature rails are effective at each main row 3 or 4 of the electromagnets. Thus in the region of the section plane IV—IV, two auxiliary armature rails may cooperate with one main row of electromagnets while in the region of the section plane III—III a main rail may and an auxiliary rail may be encountered by one of the main rows of electromagnets.

In a system in which all of the electromagnets and armature rails have the same pole spacing, of course, the encounter of two armature rails with two electromagnets on the same side would immediately result in magnetic shock and increased magnetic force unless one of the expedients of the aformentioned copending applications was employed, namely, the use of flux-canceling coils in the armature rails. However, with the system of the present invention, whereby different pole spacings are provided for the rails and cores of the main and auxiliary magnetic system, an encounter of a main electromagnet with an auxiliary rail or vice versa prevents effective closure of the magnetic flux-path so that there is little if any change in the magnetic effect. There is no such precaution to nullify a successive flux and there is no danger that magnetic shock will result.

As described in the aforementioned copending applications, moreover, the subrows of electromagnets need not have only a suspension function and indeed alternate electromagnets along a subrow may be staggered to the left and right so that lateral force components are generated between the electromagnets and armatures rails to guide and center the vehicle on the track.

We claim:

1. In a system for the electromagnetic suspension of a vehicle upon a track wherein the vehicle is provided with a pair of electromagnet arrangements on opposite sides thereof and each of the electromagnet arrangements comprises a pair of subrows of electromagnets, the track being formed with armature rails respectively cooperating with the electromagnets of said subrows and having junctions in which there is a transition of the magnetic suspension function between armature rails cooperating with subrows on a side of the vehicle, the improvement wherein one subrow of each pair of subrows forms main suspension electromagnets which may cooperate with a corresponding main armature rail, wherein the other subrow of said pair of subrows forms auxiliary suspension electromagnets which may cooperate with a corresponding auxiliary armature rail, the main armature rails and electromagnet cores of the main suspension electromagnets being provided with a substantially common pole spacing which is different from the common pole spacing of the auxiliary armature rails and the electromagnet cores of the auxiliary suspension electromagnets, such that any magnetic effects between main suspension electromagnets and auxiliary armature rails and between auxiliary suspension electromagnets and main armature rails, respectively are of insubstantial magnitude, the main armature rails and electromagnets having a greater pole spacing than the auxiliary armature rails and electromagnets.

2. The improvement defined in claim 1 wherein all of the armature rails are of downwardly open U-section configuration and all of the electromagnets and cores of U-section have openings upwardly.

3. The improvement defined in claim 2 wherein the main electromagnets are provided outwardly of the auxiliary electromagnets.

* * * * *